United States Patent
Jain et al.

(10) Patent No.: US 12,001,338 B2
(45) Date of Patent: Jun. 4, 2024

(54) METHOD AND SYSTEM FOR IMPLEMENTING METADATA COMPRESSION IN A VIRTUALIZATION ENVIRONMENT

(71) Applicant: Nutanix, Inc., San Jose, CA (US)

(72) Inventors: Gaurav Jain, Bangalore (IN); Rohit Ghivdonde, Nagpur (IN); Srihita Goli, Bellevue, WA (US); Shyam Sankaran, Chennai (IN); Anoop Jawahar, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 71 days.

(21) Appl. No.: 17/452,834

(22) Filed: Oct. 29, 2021

(65) Prior Publication Data

US 2023/0136522 A1 May 4, 2023

(51) Int. Cl.
*G06F 12/0868* (2016.01)
*G06F 9/455* (2018.01)
*G06F 9/50* (2006.01)

(52) U.S. Cl.
CPC ...... *G06F 12/0868* (2013.01); *G06F 9/45558* (2013.01); *G06F 9/5038* (2013.01); *G06F 2009/45579* (2013.01); *G06F 2009/45583* (2013.01); *G06F 2212/1021* (2013.01); *G06F 2212/7207* (2013.01)

(58) Field of Classification Search
CPC ............... G06F 9/45558; G06F 9/5038; G06F 12/0868; G06F 2009/45579; G06F 2009/45583; G06F 2212/1021; G06F 2212/7207
See application file for complete search history.

(56) References Cited

U.S. PATENT DOCUMENTS

| | | | |
|---|---|---|---|
| 7,039,766 B1* | 5/2006 | Smith | G06F 12/0862 709/200 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 2003/0135694 A1* | 7/2003 | Naffziger | G06F 12/0802 711/E12.017 |
| 2006/0047916 A1 | 3/2006 | Ying | |
| 2015/0143053 A1* | 5/2015 | Quimbey | G06F 12/0888 711/133 |
| 2015/0193353 A1 | 7/2015 | Habermann | |
| 2016/0041601 A1* | 2/2016 | Larson | G06F 11/2033 713/320 |
| 2016/0371190 A1 | 12/2016 | Romanovskiy | |
| 2017/0371793 A1* | 12/2017 | Saidi | G06F 12/0895 |

(Continued)

OTHER PUBLICATIONS

Poitras, Steven. "The Nutanix Bible" (Sep. 9, 2022), from https://nutanixbible.com/ (Publication date based on indicated capture date by Archive.org; first publication date unknown).

(Continued)

*Primary Examiner* — Eric T Oberly
(74) *Attorney, Agent, or Firm* — Vista IP Law Group, LLP

(57) ABSTRACT

Disclosed is an approach for implementing a metadata cache in a virtualization system. A self-adaptive approach is provided to keep compressed and uncompressed entries together in cache. Along with adaptive nature, disclosed is an approach to prioritize critical workloads for the cache.

27 Claims, 9 Drawing Sheets

(56) References Cited

U.S. PATENT DOCUMENTS

| | | | | |
|---|---|---|---|---|
| 2019/0324916 | A1* | 10/2019 | Armangau | G06F 12/0868 |
| 2019/0354412 | A1* | 11/2019 | Bivens | G06F 9/4843 |
| 2022/0083527 | A1* | 3/2022 | Todd | G06F 16/2282 |
| 2022/0147453 | A1* | 5/2022 | Kounavis | H04L 9/32 |

OTHER PUBLICATIONS

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Zhou, B., et al., "Improving Metadata Caching Efficiency for Data Deduplication via In-RAM Metadata Utilization," Journal of Computer Science and Technology, dated Jul. 2016.
Drew, M., "Measuring the Performance Effects of Dynamic Compression in IIS 7.0," Web Performance, Inc., copyright 2009.
Alameldeen, A., et al., "Adaptive Cache Compression for High-Performance Processors," 31st Annual International Symposium on Computer Architecture (ISCA-31) Munich, Germany, Jun. 19-23, 2004.
Young, V., et al., "CRAM: Efficient Hardware-Based Memory Compression for Bandwidth Enhancement," Cornell University, dated Jul. 20, 2018.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I et al., "Curator: Self-Managing Storage for Enterprise Clusters", *14th USENIX Symposium on Networked Systems Design and Implementation, NSDI '17*, (Mar. 27, 2017).

* cited by examiner

METHOD AND SYSTEM FOR IMPLEMENTING METADATA COMPRESSION IN A VIRTUALIZATION ENVIRONMENT

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them. Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

An "HCI" or "hyper-converged infrastructure" environment describes an improved architecture for managing I/O and storage devices in a virtualization environment. The HCI approach provides for the ability of individual nodes to be combined with peer nodes, where nodes includes both compute and storage capabilities. In some configurations, a specially configured virtual machines (referred to as "Controller VMs") or a hypervisor may be used to control and manage storage devices, including directly attached storage in addition to networked and cloud storage, to form a storage pool for the HCI nodes in a cluster of such nodes. The Controller VM or hypervisor may implement storage controller functionality to virtualize I/O access to storage hardware.

A set of metadata is maintained and used by the HCI environment to access and operate with the data within the storage pool. That metadata may be located in a location that is remote to the virtual machine and/or node that needs that metadata to operate upon a given virtual disk or other item of data. To reduce costs and latency when accessing the storage pool, a node may retain some of the metadata within a local cache. By holding metadata within a local cache, this avoids the need to incur network and round trip costs to acquire that metadata from a remote metadata store. However, the amount of space available to cache the metadata is limited in size, and hence often is not large enough to hold all of the metadata that is needed by that node and/or the VMs on that node. This inability of the local cache to hold all of the necessary metadata means that storage-related performance may suffer due to the need to acquire the necessary metadata in real-time to perform a desired storage-related function.

Therefore, what is needed is an improved approach to manage metadata in a virtualization system that overcomes at least the above-described problems.

SUMMARY

Embodiments of the present invention provide an approach for implementing a metadata cache in a virtualization system. Some embodiments provide a self-adaptive approach to keep compressed and uncompressed entries together in cache. Along with adaptive nature, some embodiments can prioritize critical workloads (e.g., as defined by client), which will further improves the quality of cache.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings.

DETAILED DESCRIPTION OF THE EMBODIMENTS OF THE INVENTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the present invention provide an approach for implementing a self-adaptive cache to keep compressed and uncompressed entries together in the cache.

Figure 1:
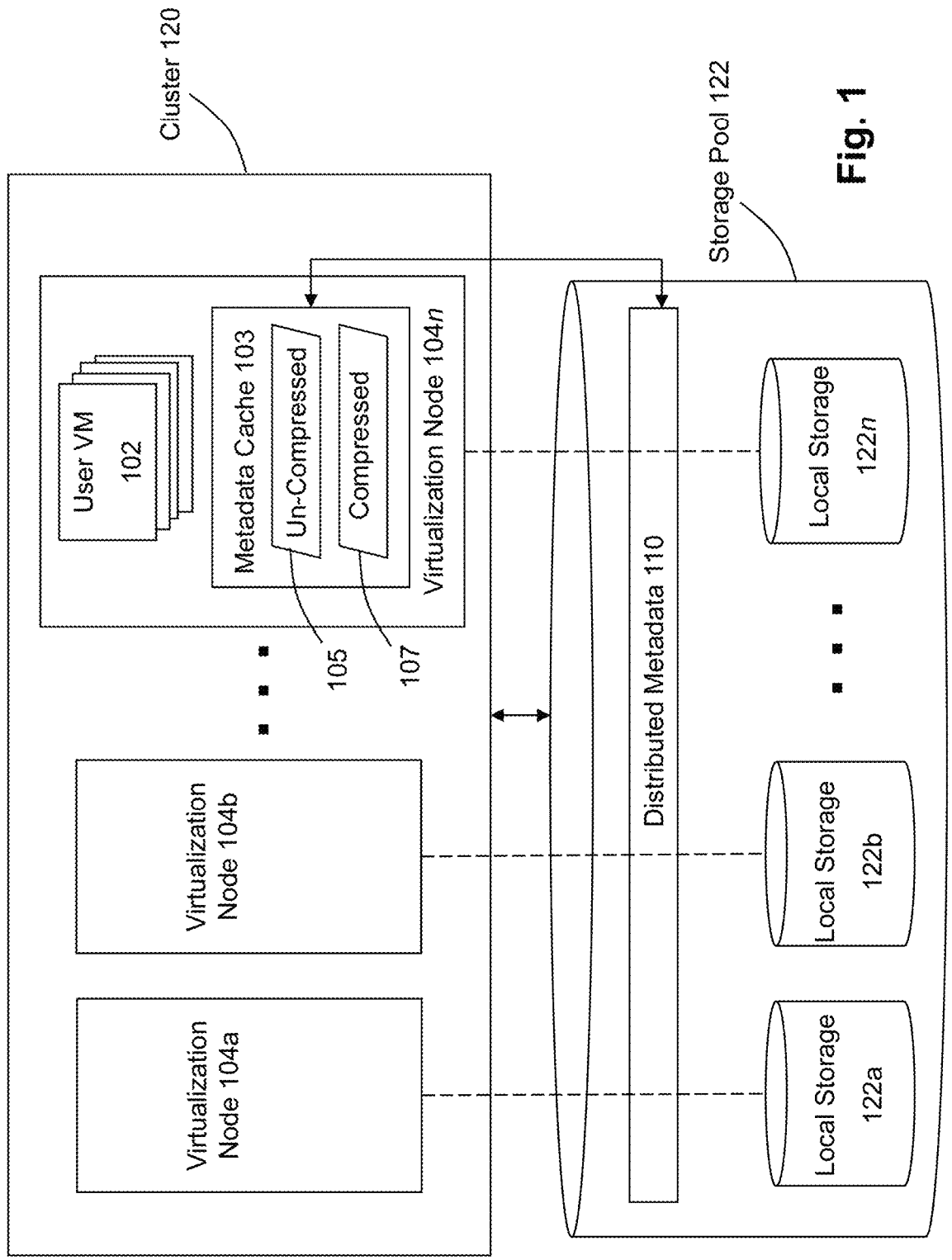
FIG. 1 illustrates an architecture for implementing improved metadata cache management according to some embodiments of the invention.

FIG. 1 illustrates an architecture for implementing improved metadata cache management according to some embodiments of the invention. The architecture of FIG. 1 is implemented for a distributed platform that contains multiple nodes 104a, 104b, through 104n. The nodes manage multiple tiers of storage, including storage that is accessible through a network, such as cloud storage, but which may include management of local storage 122a, 122b, and 122n that are within or directly attached to the respective nodes 104a, 104b, and 104n. Examples of such storage include SSDs ("solid state drives") or HDDs ("hard disk drives").

These collected storage devices, both local and networked, form a storage pool 122. The storage pool 122 comprises a common set of storage that can be accessed by any node within the cluster 120, and for which a common address space is used to access any of the storage within the storage pool 122.

Each of the nodes may runs software to implement virtualization on the node. For example, a node may include a hypervisor to manage the interactions between the underlying hardware on the node and the one or more user-space virtual machines (VMs) 102 that run on the node. In some embodiments, a special VM (referred to herein as either a "control virtual machine" (CVM) or a "service virtual machine") can be used to manage storage and I/O activities to the storage pool 122. The CVMs run as virtual machines above a hypervisor, and the CVMs on the different nodes work together to form a distributed system that manages all the storage resources, including the locally attached storage, to form the logical storage pool 122. In an alternate embodiment, the virtualization storage controller may be implemented from a hypervisor instead of a separate CVM. Virtualization storage controllers operate to exports storage (e.g., as block devices or NFS server targets) that appear as disks to the client VMs 102a-d. These disks are virtual, since they are implemented by the software running inside the CVMs or hypervisors storage functionalities.

Virtual disks (or "vDisks") that are accessible to the VMs can be structured from the storage devices in the storage pool 122. vDisks are the virtual disks that are exported to user VMs, e.g., by the CVMs or a hypervisor. A vDisk is a software abstraction that manages an address space of S bytes where S is the size of the block device. The data in the vDisk is may be managed according to configuration parameters, such as whether deduplication or compression is to be applied to the stored data.

Metadata is maintained by the virtualization system to track and handle the data and storage objects in the system. For example, each vDisk may corresponds to a virtual address space forming the individual bytes exposed as a disk to user VMs. In some embodiments, this address space is broken up into equal sized units called vDisk blocks. The metadata in the system is used to track and maintain the contents of the vDisks and vDisk blocks using various referencing, tracking and/or mapping structures. For example, in one example embodiment, metadata is maintained using three mapping structures to track the stored data, including: (a) a first metadata structure (vDisk map) that is used to map the vDisk address space for the stored extents, where given a specified vDisk and offset, the vDisk map can be used to identify a corresponding extent ID; (b) a second metadata structure (extent ID map) is used to map extent IDs, where given a specified extent ID, the extent ID map can be used to identify a corresponding extent group; and (c) a third metadata structure (extent group ID map) is used to map specific storage information for extent group IDs, where given a specified extent group ID, the extent group ID map can be used to identify corresponding information, such as for example, (1) disk identifier for the extent group, (2) list of extent IDs in that extent group, (3) information about the extents such as reference counts, checksums, and offset locations.

In some embodiments, the metadata is maintained in a distributed metadata database 110. The distributed metadata database may be implemented, for example, as a NoSQL distributed key-value database, e.g., using the Apache Cassandra database product. The metadata contents of the distributed metadata database 110 may be distributed across the multiple storage devices within the storage pool 122—in much the same way that ordinary data is stored within the storage devices of the storage pool 122.

Since metadata is required by a node/VM to access data (e.g., a vdisk) within storage pool 122—in order to know about the location of a specific item of data within a specific storage device within the storage pool—this means that the node/VM must have access to the correct metadata item for the vdisk in order to access that vdisk. For every storage operation (e.g., a read or write), this metadata is consulted to determine which data stored item (e.g., which replica) to read the data from, which ones to update, which ones to fix, etc; therefore, having quick access to metadata is of significant importance to system performance. Since the metadata within the system is stored in a distributed manner, this means that when a node 104n in cluster 120 needs to access a vdisk, then that node/VM will likely need to retrieve that metadata from across the network in order to get the required metadata. If this network access and request/return roundtrip is performed each and every time an item of metadata is needed, then this is become a quite expensive and time-consuming effort each time the metadata is needed. The cost requirements to read/update metadata in the distributed metadata database is even more expensive when considering the additional operations needed to maintain consistency and durability in the database, e.g., by applying consensus algorithms for consistency purposes or needing to maintain multiple data item copies to satisfy replication factor (RF) requirements.

Therefore, to achieve higher performance, it is often desired to locally cache the metadata within a local metadata cache 103 on the local node 104*n*, to avoid having to constantly retrieve the same metadata over and over again. This cache hosts the recently accessed metadata and is used in the I/O path to lookup/update the metadata. The cache is local to each node and improves performance.

The metadata cache may be structured using any suitable cache architecture. In some embodiments, the metadata cache is organized using an LRU (least recently used) scheme, whereby the least recently used items in the cache are the items that are first evicted when free memory space runs out in the cache. The cache may be structured to include multiple different cache pools, including both a "single-touch" pool and a "multi-touch" pool. When a VM seeks to perform an operation on a vdisk, if the metadata for that vdisk is not already in cache, then that metadata is retrieved from the distributed database and placed into the single touch pool of the cache. If that metadata is not used again on the node and/or by the VM, then the metadata will stay in the single touch pool and will eventually be evicted from cache according to the LRU policy. However, if that metadata is used again before eviction, then that metadata is placed into the multi-touch pool. Every time the metadata is used in the multi-touch pool, then it is placed at the head of the queue in the pool for LRU purposes.

This setup works well when metadata completely fits in cache, but the standard cache approach may not be able to handle situations when metadata is larger than available cache size. Therefore, while in-memory caching essentially helps in improving the average latency of lookups, by keeping the data likely to be used again in memory, the cache(s) are generally smaller in size as compared to backend databases and hence cannot hold entire data to be needed by the VM-based applications. In such scenarios, the extent of performance impact on the application can be directly proportional to the number of cache misses in the storage service, since every cache miss in the storage service would have to consult the backend metadata database, thereby increasing the time to access metadata, and slowing down overall I/O.

Embodiments of the invention provide a solution whereby the metadata cache implements compression of the metadata, which thereby permits a greater number of metadata items to be held in the metadata cache. In particular, embodiments of the invention implement a local metadata cache 103 that can include both compressed metadata 107 and uncompressed metadata 105.

Any suitable compression technique may be used in embodiments of the invention. For example, one type of compression that may be used is the protobuf serialization approach, although of course, one can choose any technique available. With the protobuf serialization approach, given the uncompressed protobuf object, compression (serialization) can lead to reduction up to ⅓rd of in memory footprint. At max compression, one can reach up to the entire cache being compressed, e.g., with all entries compressed, where the system should be able to accommodate 3× entries compared to regular caching.

In summary, to achieve high performance, the metadata required to serve VM I/Os is put into the metadata cache. In an ideal situation when the working set of metadata is completely able to fit in the metadata cache, this permits all of the metadata to be uncompressed to achieve optimum performance. But in case of too-large working sets that cannot all fit into the metadata cache, this is likely to result in cache misses and end up serving lookup queries from the comparatively slower backend across the network to the distributed metadata database. The current solution is operable to automatically trigger cache compression for at least some of the in-memory cache in case of such space crunch issues.

Figure 2:
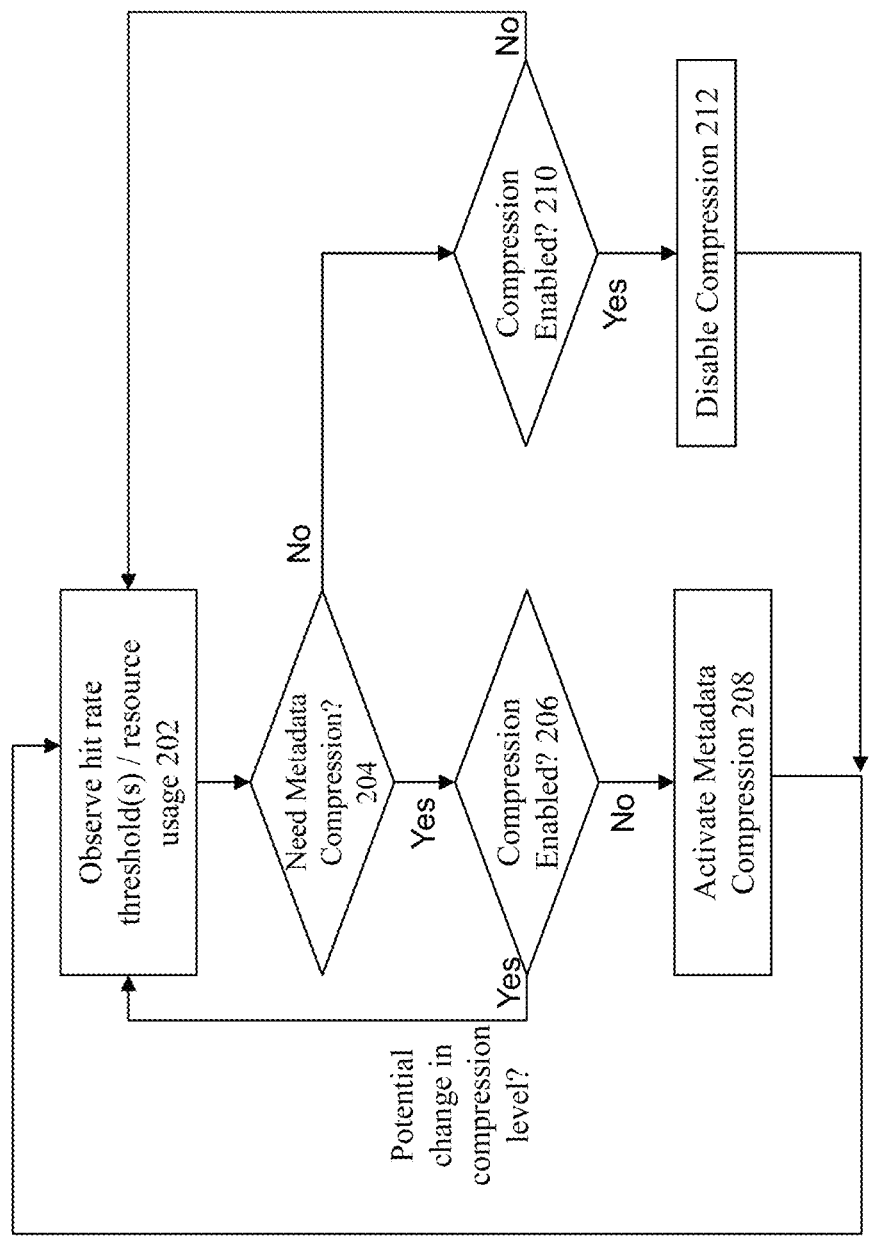
FIG. 2 shows a flowchart of an approach to implement dynamic compression in a metadata cache according to some embodiments of the invention.

FIG. 2 shows a flowchart of an approach to implement dynamic compression in a metadata cache according to some embodiments of the invention. This approach of dynamically establishing compression for metadata in the cache helps in virtually expanding in-memory cache by keeping some (or all) entries in compressed format, making space for others, which potentially would have been evicted in normal scenarios.

At step 202, a determination of when to activate metadata compression is performed by observing several factors within the system. Factors that may be considered include, for example: (a) the cache hit rate; (b) the cache tail hit rate (also referred to as the LRU tail hit rate); and/or (c) the current cache usage. The cache hit rate refers to the rate in which a metadata item that is sought already exists within the cache. If the item is in cache, then this counts as a "hit", whereas if the item is not in cache, then this counts as a "miss". The cache tail hit rate refers to the hit rate for items in the LRU tail. The general idea is that the workload within a system may be constantly changing, and when the system is switching over from workload 1 to workload 2, then it does not make sense to retain any items remaining in cache from workload 1 (even if there are a large number of such items in cache) when it is can be anticipated that the system will really only need to be accessing items for workload 2 in the future. The LRU tail hit rate can be used to identify items that should be either retained or evicted in such circumstances. The current cache usage data refers to the amount of cache that is currently being used, with the general idea being that compression is really only needed when the free space in cache is used up and therefore there is no further space in cache for metadata that really should stay in cache (if uncompressed).

At 204, a determination is made whether cache compression is needed. The data observed in step 202 may be used to make this determination. Any suitable criteria may be used to decide whether metadata compression should be turned on. For example, when cache is running out of capacity and the system is seeing a high tail hit ratio with a lower cache hit rate, this indicates that every entry present in cache is important and thus the system needs more caching space to further bump the cache throughput. This would be an example of a situation where cache compression should be enabled. On the other hand, situations may dictate that cache compression should not be enabled. For example, if the cache hit rate is very high and the current cache usage indicates that there is plenty of available cache space, then this indicates that the items in cache should be held in an uncompressed state.

If it is determined that cache compression is needed, then a determination is made at 206 whether compression is already enabled. If not, then metadata compression is dynamically enabled at 208. When compression is enabled, then further analysis is needed to determine the specific compression level to be applied, which is discussed in more detail below with respect to FIG. 3. If the metadata compression is already enabled, then the system retains the compression and returns back to 202 for the next round of observations. Depending upon the observed data, it is possible that a change may be made to the compression levels.

If it is determined that cache compression is not needed, then a determination is made at 210 whether compression is already enabled. If not, then processing returns back to 202 for the next round of observations. If compression is already enabled but is no longer needed, then compression can be dynamically disabled at 212.

Figure 3:
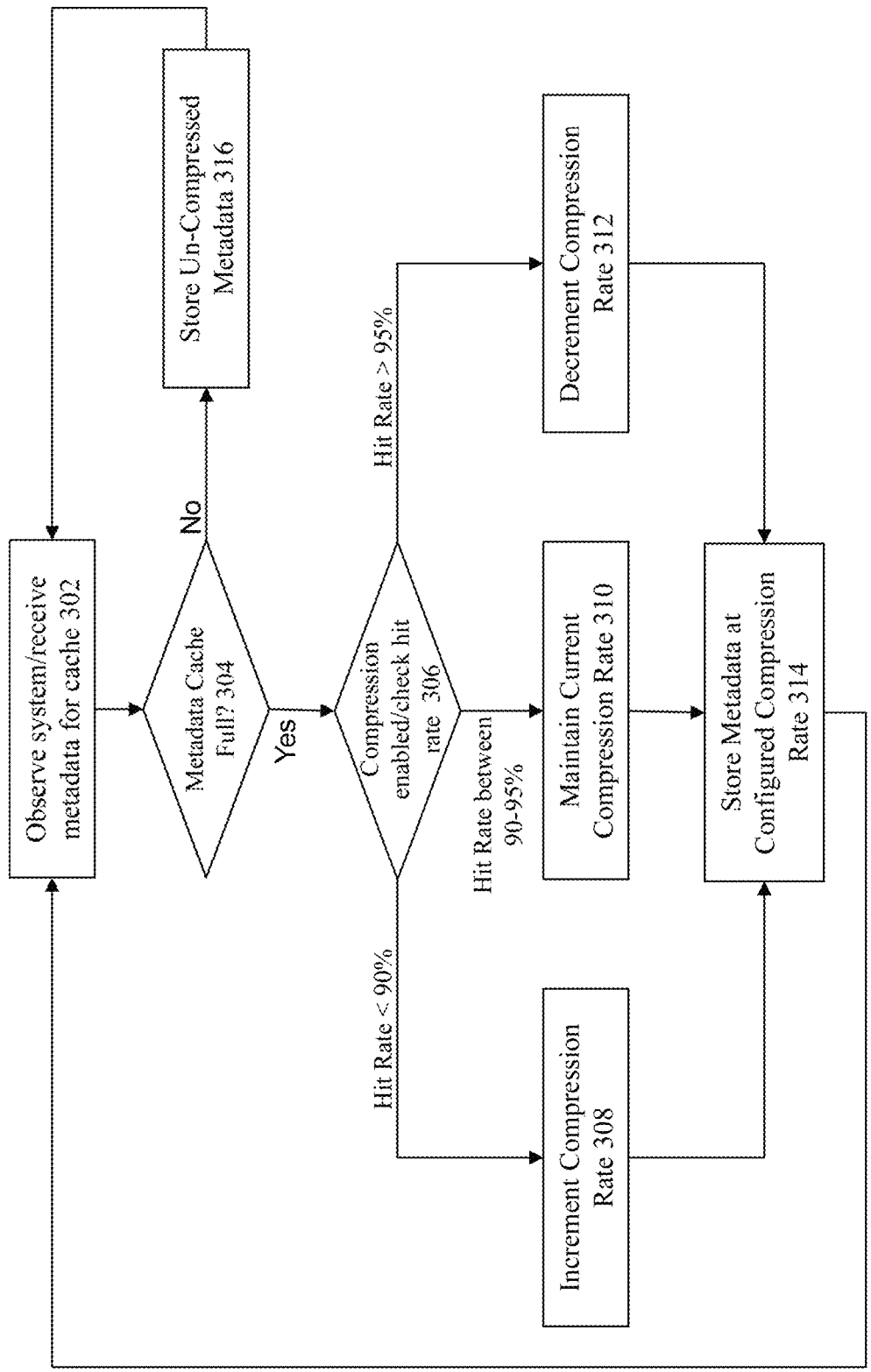
FIG. 3 provides a more detailed flowchart of an approach to adjust a specific compression level according to some embodiments of the invention.

FIG. 3 provides a more detailed flowchart of an approach to adjust the specific compression level according to some embodiments of the invention. Upon enablement of compression, setting the correct compression ratio is important, since a lesser compression ratio can result in continuing to have excessive cache misses, whereas a higher than needed compression ratio will definitely improve cache hit rate but can lead to unnecessarily increased average lookup latency for cache entries, due to cost associated with uncompressing the entries.

At 302, observations are made of the various system factors, including hit rate and cache usage. This may be performed for example, on an every 5 second basis to observer the hit rate for that 5 second period.

At 304, a determination is made whether the metadata cache is full (or at least "full" as determined by whether the cache usage has met or exceeded a given threshold usage level). If the cache is not full, then there is no need to compress the metadata in cache. As such, at 316, the cache will store un-compressed metadata.

If the metadata cache is full (or at least meets a fullness threshold), then it is assumed that compression is already enabled or will be enabled (e.g., according to the approach of FIG. 2), and a further determination is made at 306 of the compression rate that should be applied to the metadata cache. The basic principle to be applied is that if the current compression rate is not sufficient to produce a good cache hit rate, then it needs to increase further. However, if the system has already achieved a good hit rate with the current compression, then the system can either maintain or reduce the compression.

In some embodiments, a hit rate less than 90% is considered to a poor hit rate. As such, if the observed hit rate is less than 90%, then at 308 the compression rate is increased to attempt to improve the hit rate. For example, the compression rate may be increased on a stepped basis by 5 percent or 10 percent during each increase.

On the other hand, in some embodiment, a hit rate between 90% and 95% is considered to be an adequate and acceptable hit rate level. Therefore, if the observed hit rate is between 90 and 95 percent, then the compression rate is maintained at its current level to attempt to maintain the status quo.

In some embodiment, a hit rate above 95% may be considered to be a very good hit indicator that perhaps too much compression has been implemented. Therefore, if the observed hit rate is above 95 percent, then the compression rate is decreased to a lower level. For example, the compression rate may be decreased on a stepped basis by 5 percent or 10 percent during each decrease. It is possible that the system may eventually disable cache compression entirely when the compression rate is decremented to zero percent. At 314, the metadata is thereafter stored at the designated compression level.

Figure 4:
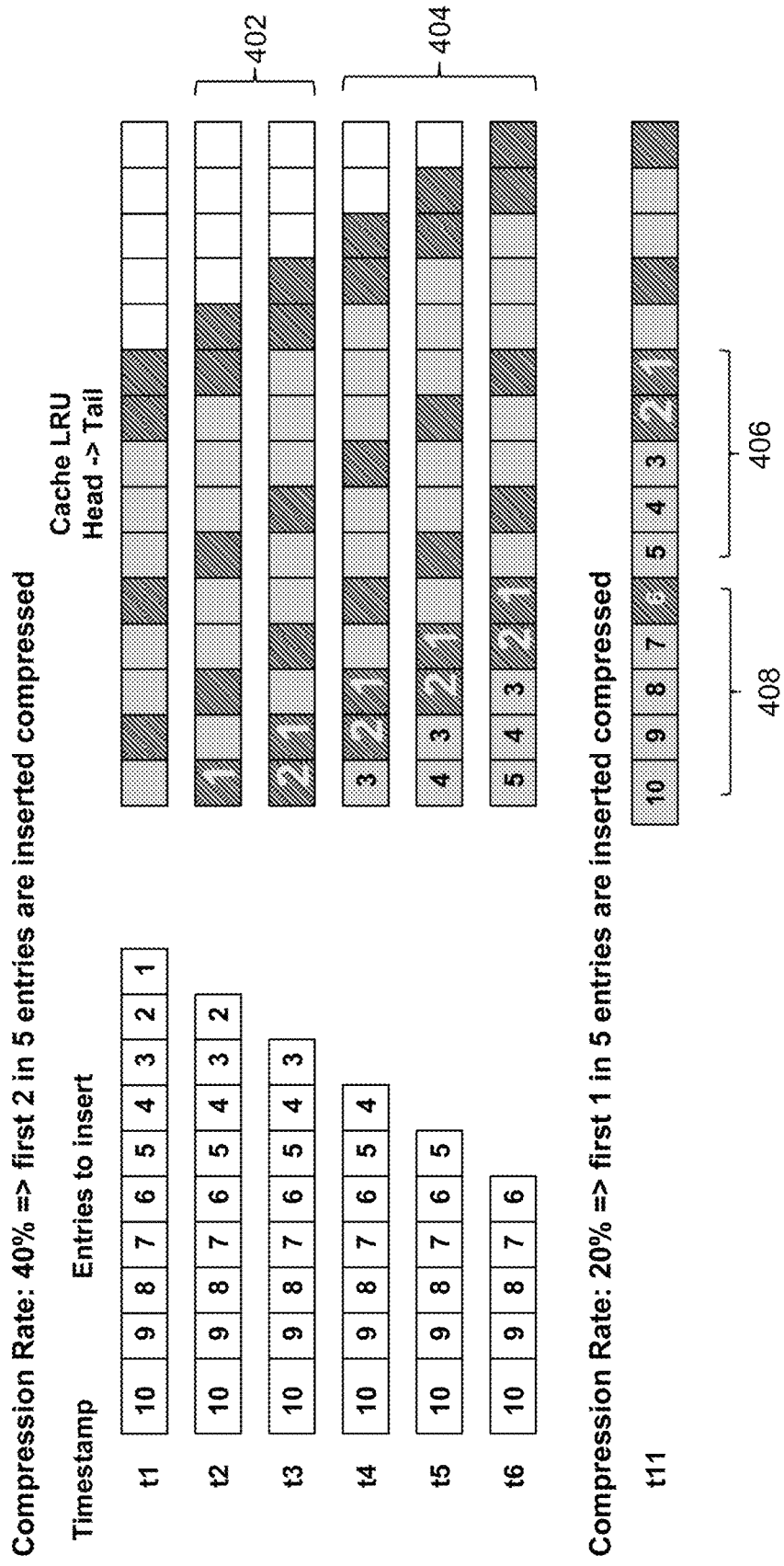
FIG. 4 provides an illustration of a compression technique that may be applied according to some embodiments of the invention.

FIG. 4 provides an illustration of a compression technique that may be applied according to some embodiments of the invention. This approach implements compression using a "uniform compression" technique, where entries are compressed during inserts to the cache based on a selected compression rate.

As shown in the top portion of FIG. 4, consider if the selected compression rate is 40%. This compression rate can be implemented by compressing the first two entries out of every five entries. As illustrated in the figure, it is assumed that entries "1", "2", "3", "4", and "5" need to be inserted into cache. With a 40% compression rate, this means that the first two entries "1" and "2" are progressively inserted with compression as shown at 402. However, the next three entries "3", "4", and "5" are thereafter inserted into the cache without compression, as shown at 404.

When the compression rate changes from one time period to the next, this results in the next set of entries being compressed with a different compression rate. For example, assume that the next time period needs to insert entries "6", "7", "8", "9", and "10" into cache. Further assume that the compression rate is decreased from 40% to 20% in this next time period. This means that only the first entry "6" is compressed, whereas entries "7", "8", "9", and "10" are inserted in an uncompressed manner. This transition is shown from time period 406 where 40% compression is applied to time period 408 where only 20% compression is applied.

There are several advantages to using this type of compression technique. One advantage is that this approach does not incur compression overhead during inserts if the metadata from the distributed backend is already being delivered in a compressed state. In addition, in this approach, it is noted that cache hits do not affect compression state, e.g. they neither compress uncompressed entries nor decompress compressed entries.

In another embodiment, compression may be applied only to certain identified workloads/VMs. For example, a user can define critical workloads to the storage layer, so that the backend can optimize throughput only to these critical applications. This solution will allow the system to focus on critical VMs (workloads) first, so that client applications can have minimal impact on the system.

Figure 5:
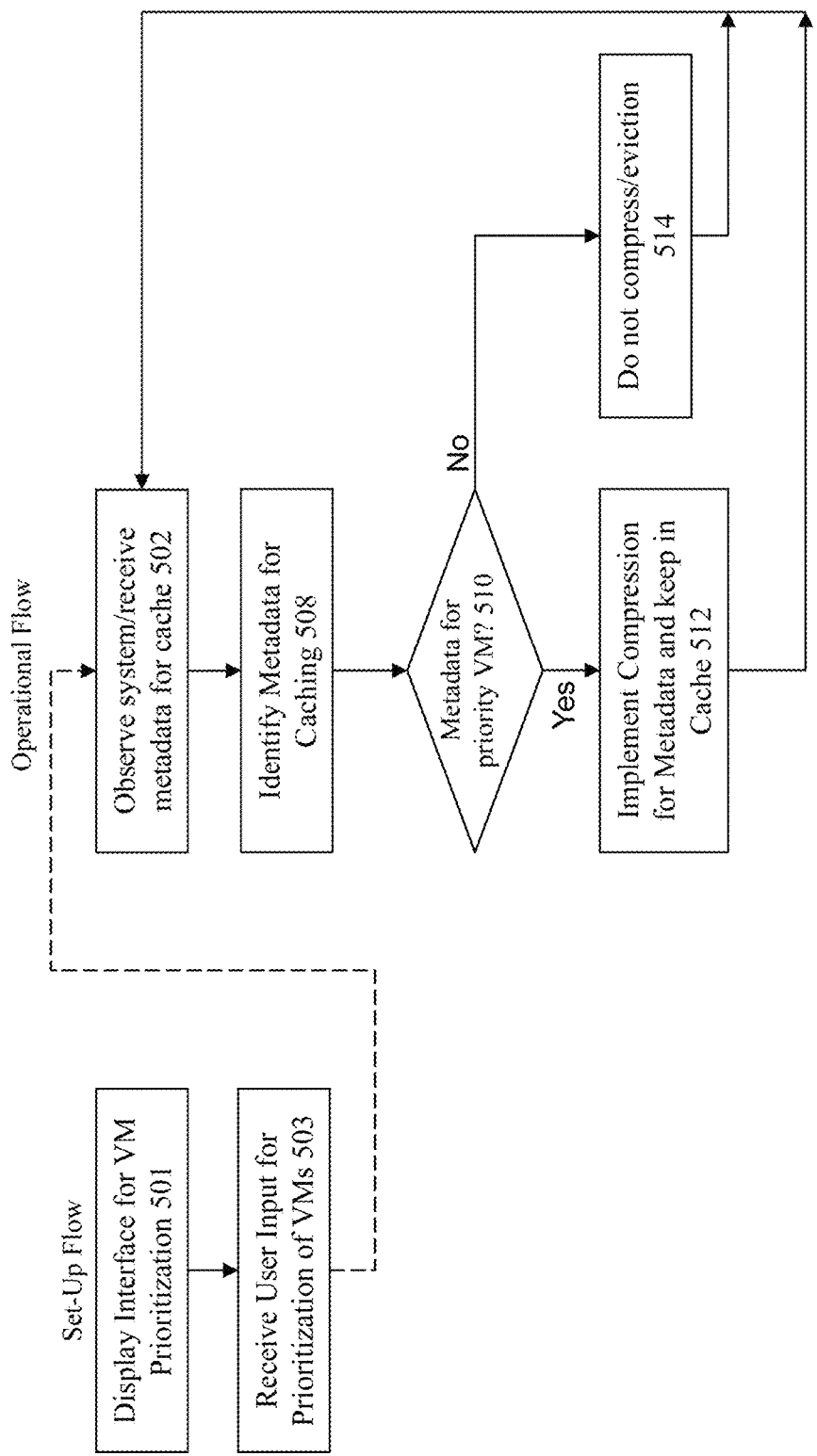
FIG. 5 shows a flowchart of an approach to employ criticality and/or prioritization as a way to focus compressions for only certain of the metadata within the cache.

FIG. 5 shows a flowchart of an approach to employ criticality and/or prioritization as a way to focus compressions for only certain of the metadata within the cache. During a set-up stage, at 501, an interface may be displayed for a user to designate prioritization for one or more workloads/VMs within the system. For example, a drop-down menu may be displayed to the user with a list of VMs eligible to be configured/selected for prioritization. In some embodiments, additional data may be displayed as well to the user, e.g., pertaining to the type of workload associated with the VM along with other information about the VM/workload such as performance and/or usage data.

At 503, the user may use the interface to select one or more VMs/workloads for which prioritization may be given for metadata compression. In an alternative embodiment, the system may automatically perform selection of the VMs/workloads for the prioritization. Any suitable criteria may be used to direct the selection process, whether manual or automatic. For example, VMs/workloads that are deemed to be latency sensitive may be selected to be the priority matters for which compression is to be applied.

During the normal operational flow, at 502, observations are made of the various system factors as discussed above, including hit rate and cache usage. A determination is made at 508 of the metadata that is to be maintained within the cache.

A check is made at 510 whether the metadata pertains to storage operations needed by a critical VM or workload. If so, then this means that the metadata in cache will be considered as critical entries. As such, at 512, the cache will only allow entries pertaining to critical VM/vdisk cache. At 514, regular (non-critical) entries lookup can fallback to a slower (backend) path, since they will may be rare and/or the application may not be sensitive to the latency.

It is noted that additional optimizations may be implemented to improve upon the performance of the system. For example, a weak pointer reference approach may be employed. To explain, consider that cache compression has its own overheads of compressing and decompressing the cache entry on each insert and lookup call. During an Insert operation, there may be an option for clients to pass through compression calls and achieve similar cache insert latency. However, if there is no control by the client on the lookup path, then it has to decompress the entry on every lookup call. In order to minimize lookup latency in this situation, the system can use a weak pointer reference approach, where during cache lookup for a compressed entry, the system keeps a weak pointer to the uncompressed entry along with a compressed one, and hence simultaneous lookups for that entry can be served from this uncompressed version. The approach provides a benefit because the cache is known to keep only hot (frequently accessed) entries. If the entry being looked up is supposed to be looked up again, then the weak reference logic will kick in and the system will be serving an uncompressed version for subsequent lookup calls. Otherwise, the system continues to have the compressed entry in cache and the next lookup (which may not occur again soon) potentially incurs a decompression penalty.

In some additional embodiments, the current compression ratio can be exposed to the client, so that the client can choose its own compression technique and efficiently send them to cache during an Insert API call. In certain systems, a write-through cache may be employed, where the entry getting updated to (or from) the backend may be serialized anyway. Hence the cache's client can track this entry and provide the same during cache call.

Therefore, what has been provided is an improved approach to implement a metadata cache in a virtualization system. The approach is self-adaptive to keep compressed and uncompressed entries together in cache and mostly in the same LRU. Hence, the system can make concrete decisions about the existence of this entry in cache. In addition, from the client (application) perspective, there is only the need to perform a single lookup. Along with adaptive nature, some embodiments can prioritize critical workloads (e.g., as defined by client), which will further improves the quality of cache.

System Architecture Overview

Additional System Architecture Examples

All or portions of any of the foregoing techniques can be partitioned into one or more modules and instanced within, or as, or in conjunction with, a virtualized controller in a virtual computing environment. Some example instances within various virtual computing environments are shown and discussed as pertains to FIG. 6A, FIG. 6B, FIG. 6C, and FIG. 6D.

Figure 6A:
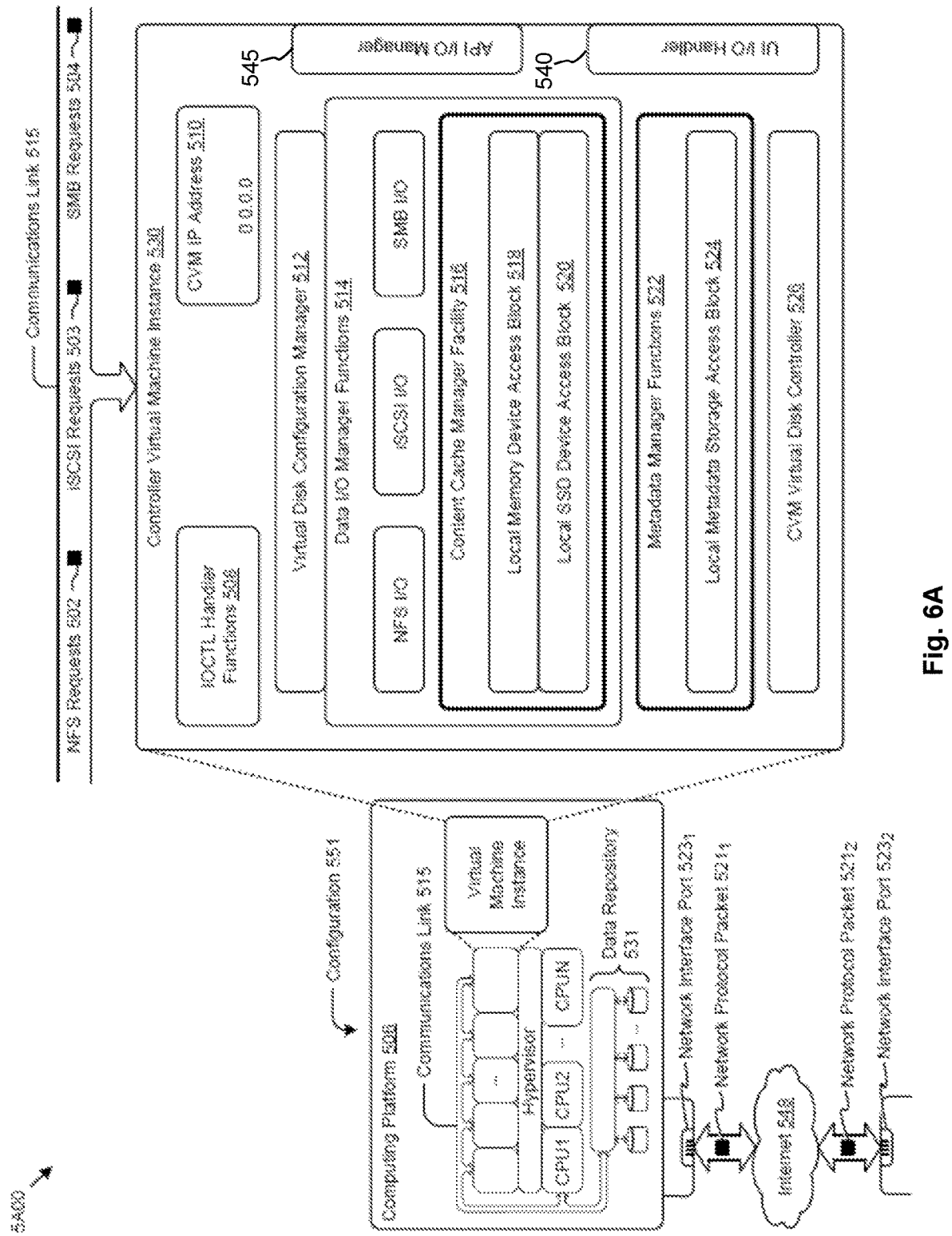
FIG. 6A, FIG. 6B, FIG. 6C, and/or FIG. 6D provide illustrations of computing environments, systems, and/or technologies which may be used in conjunction with embodiments of the invention.

FIG. 6A depicts a virtualized controller as implemented in the shown virtual machine architecture 5A00. The heretofore-disclosed embodiments, including variations of any virtualized controllers, can be implemented in distributed systems where a plurality of networked-connected devices communicate and coordinate actions using inter-component messaging. The virtualized controller may be employed to implement the metadata management scheme described above.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 5A00 comprises a collection of interconnected components suitable for implementing embodiments of the present disclosure and/or for use in the herein-described environments. Moreover, virtual machine architecture 5A00 includes a virtual machine instance in configuration 551 that is further described as pertaining to controller virtual machine instance 530. Configuration 551 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 530.

In this and other configurations, a controller virtual machine instance receives block I/O storage requests as network file system (NFS) requests in the form of NFS requests 502, and/or internet small computer storage interface (iSCSI) block IO requests in the form of iSCSI requests 503, and/or Samba file system (SMB) requests in the form of SMB requests 504. The controller virtual machine (CVM) instance publishes and responds to an internet protocol (IP) address (e.g., CVM IP address 510). Various forms of input and output can be handled by one or more IO control handler functions (e.g., IOCTL handler functions 508) that interface to other functions such as data IO manager functions 514 and/or metadata manager functions 522. As shown, the data IO manager functions can include communication with virtual disk configuration manager 512 and/or can include direct or indirect communication with any of various block IO functions (e.g., NFS TO, iSCSI IO, SMB TO, etc.).

In addition to block IO functions, configuration 551 supports IO of any form (e.g., block IO, streaming IO, packet-based IO, HTTP traffic, etc.) through either or both of a user interface (UI) handler such as UI IO handler 540 and/or through any of a range of application programming interfaces (APIs), possibly through API IO manager 545.

Communications link 515 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 530 includes content cache manager facility 516 that accesses storage locations, possibly including local dynamic random access memory (DRAM) (e.g., through local memory device access block 518) and/or possibly including accesses to local solid state storage (e.g., through local SSD device access block 520).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 531, which in turn can be formatted into any one or more storage areas, and which can comprise parameterized storage accessible by a key (e.g., a filename, a table name, a block address, an offset address, etc.). Data repository 531 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 524. The data repository 531 can be configured using CVM virtual disk controller 526, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 551 can be coupled by communications link 515 (e.g., backplane, LAN, PSTN, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port $523_1$ and network interface port $523_2$). Configuration 551 can be addressed through one or more network interface ports using an IP address. Any operational element within computing platform 506 can perform sending and receiving operations using any of a range of network protocols, possibly including network protocols that send and receive packets (e.g., network protocol packet $521_1$ and network protocol packet $521_2$).

Computing platform 506 may transmit and receive messages that can be composed of configuration data and/or any other forms of data and/or instructions organized into a data structure (e.g., communications packets). In some cases, the data structure includes program instructions (e.g., application code) communicated through the Internet 548 and/or through any one or more instances of communications link 515. Received program instructions may be processed and/or executed by a CPU as it is received and/or program instructions may be stored in any volatile or non-volatile storage for later execution. Program instructions can be transmitted via an upload (e.g., an upload from an access device over the Internet 548 to computing platform 506). Further, program instructions and/or the results of executing program instructions can be delivered to a particular user via a download (e.g., a download from computing platform 506 over the Internet 548 to an access device).

Configuration 551 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to dynamic creation and maintenance of shard controllers in a virtualization system. In some embodiments, a module may include one or more state machines and/or combinational logic used to implement or facilitate the operational and/or performance characteristics pertaining to dynamic creation and maintenance of shard controllers in a virtualization system.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic creation and maintenance of shard controllers in a virtualization system). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to dynamic creation and maintenance of shard controllers in a virtualization system, and/or for improving the way data is manipulated when performing computerized operations pertaining to assigning unique I/O handling threads to non-overlapping shards of a vDisk.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 6B:
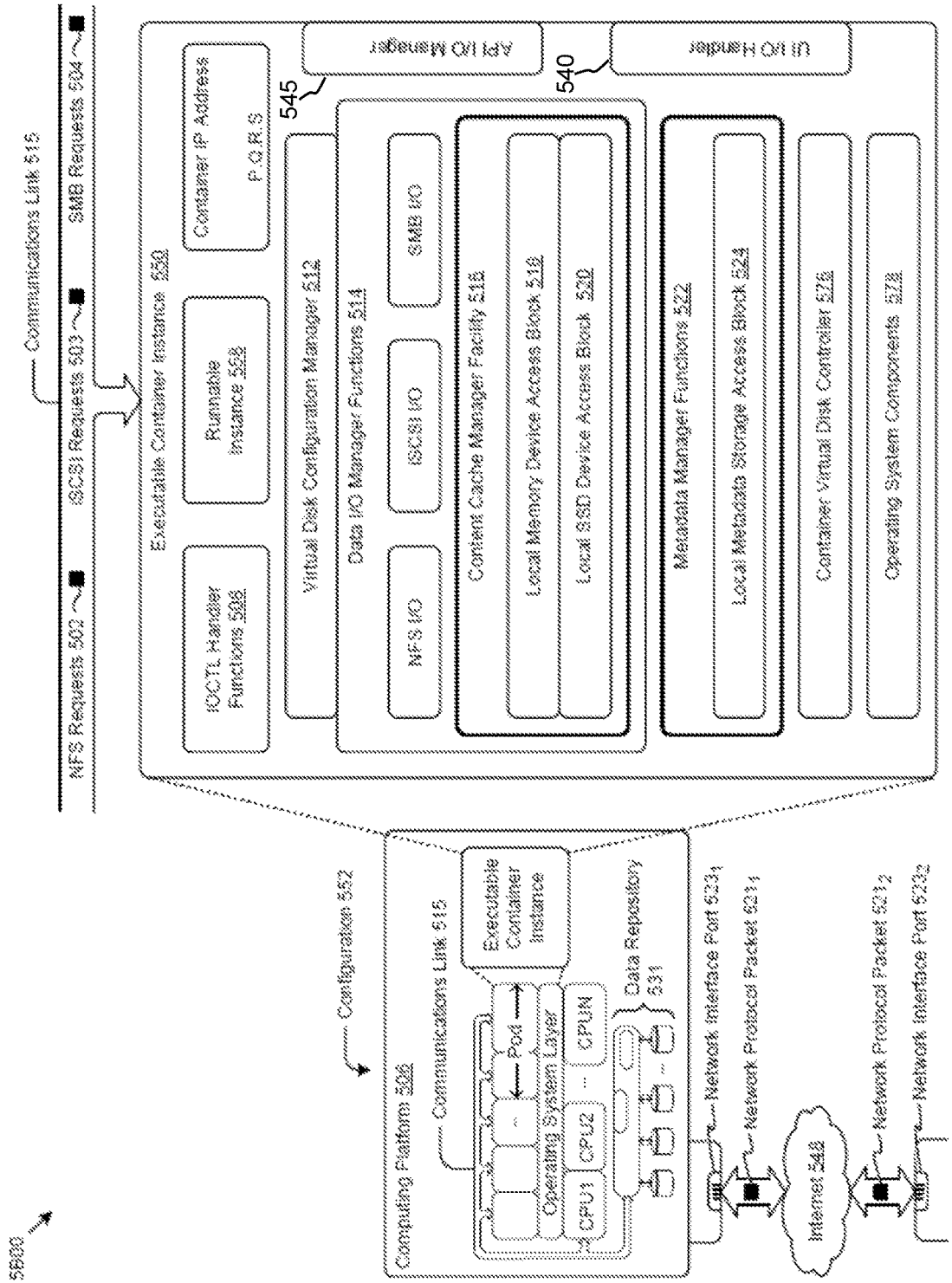

FIG. 6B depicts a virtualized controller implemented by containerized architecture 5B00. The containerized architecture comprises a collection of interconnected components suitable for implementing embodiments of the present disclosure and/or for use in the herein-described environments. Moreover, the shown containerized architecture 5B00 includes an executable container instance in configuration 552 that is further described as pertaining to executable container instance 550. Configuration 552 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 550). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 578, however such a separate set of operating system components need not be provided. As an alternative, an executable container can include runnable instance 558, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
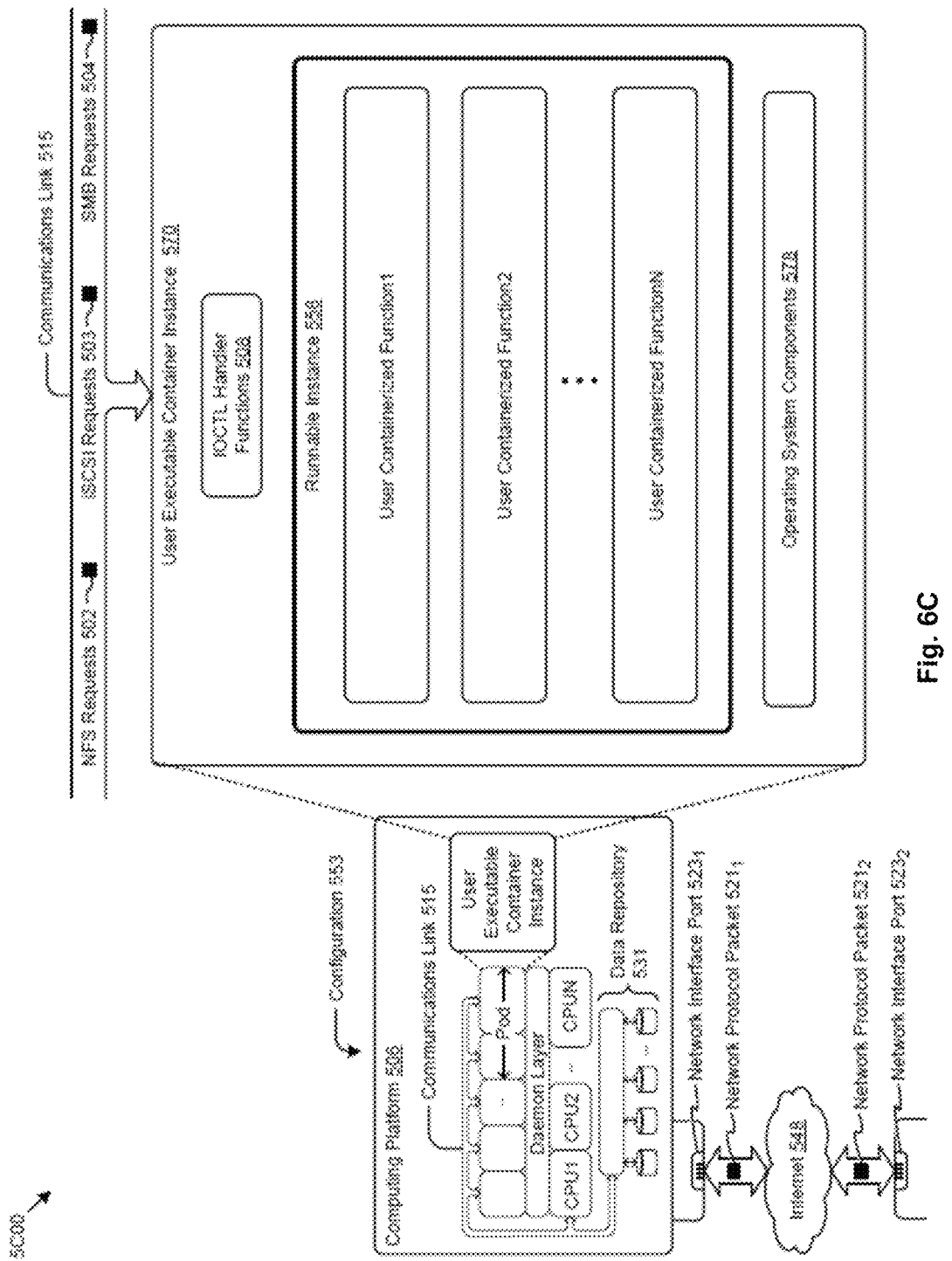

FIG. 6C depicts a virtualized controller implemented by a daemon-assisted containerized architecture 5C00. The containerized architecture comprises a collection of interconnected components suitable for implementing embodiments of the present disclosure and/or for use in the herein-described environments. Moreover, the shown daemon-assisted containerized architecture includes a user executable container instance in configuration 553 that is further described as pertaining to user executable container instance 570. Configuration 553 includes a daemon layer (as shown) that performs certain functions of an operating system.

User executable container instance 570 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 558). In some cases, the shown operating system components 578 comprise portions of an operating system, which portions are interfaced with or included in the runnable instance and/or any user containerized functions. In this embodiment of a daemon-assisted containerized architecture, the computing platform 506 might or might not host operating system components other than operating system components 578. More specifically, the shown daemon might or might not host operating system components other than operating system components 578 of user executable container instance 570.

The virtual machine architecture 5A00 of FIG. 6A and/or the containerized architecture 5B00 of FIG. 6B and/or the daemon-assisted containerized architecture 5C00 of FIG. 6C can be used in any combination to implement a distributed platform that contains multiple servers and/or nodes that manage multiple tiers of storage where the tiers of storage might be formed using the shown data repository 531 and/or any forms of network accessible storage. As such, the multiple tiers of storage may include storage that is accessible over communications link 515. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 551 of FIG. 6A) to manage the interactions between the underlying hardware and user virtual machines or containers that run client software.

Distinct from user virtual machines or user executable containers, a special controller virtual machine (e.g., as depicted by controller virtual machine instance 530) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
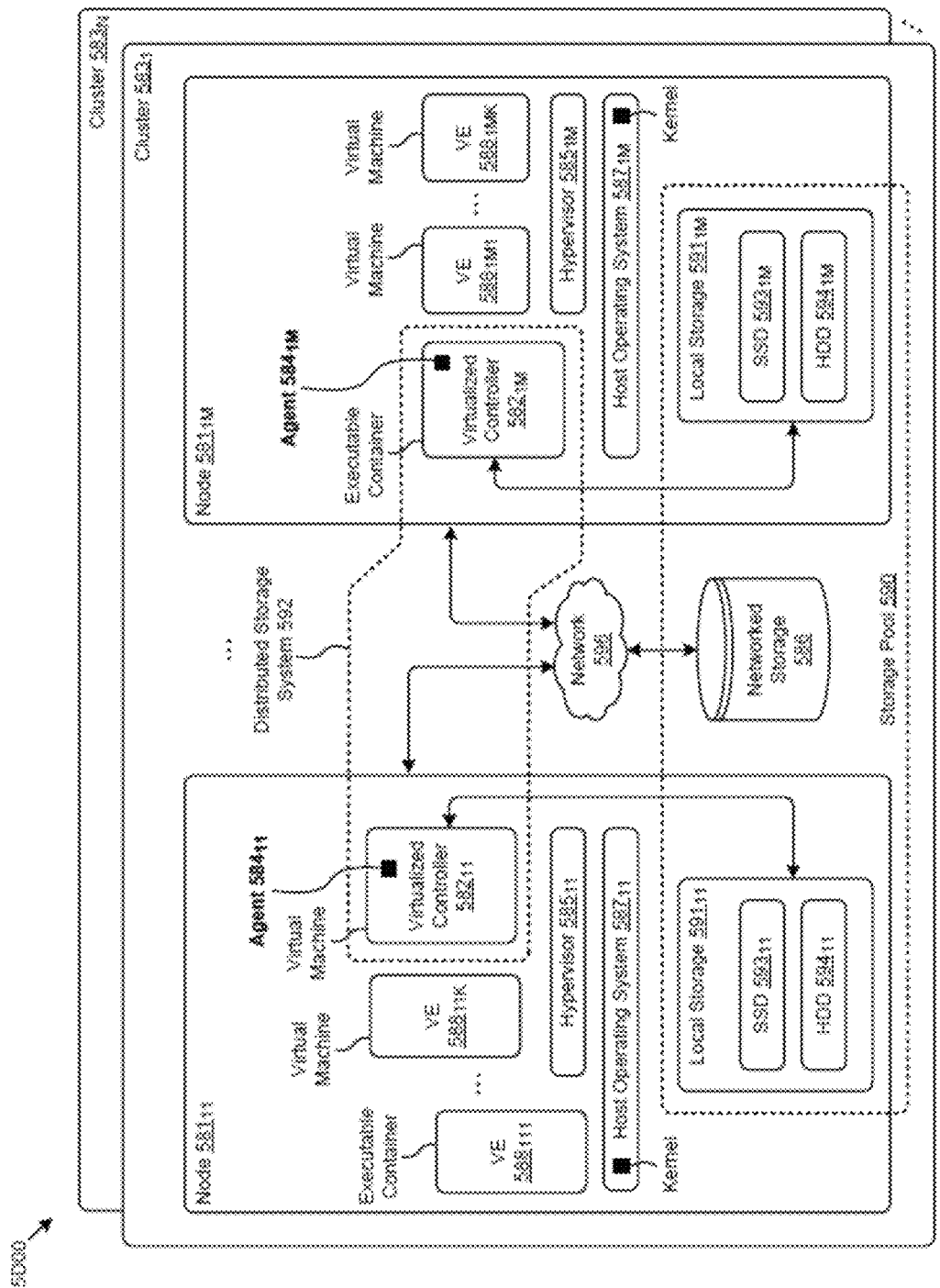

FIG. 6D depicts a distributed virtualization system in a multi-cluster environment 5D00. The shown distributed virtualization system is configured to be used to implement the herein disclosed techniques. Specifically, the distributed virtualization system of FIG. 6D comprises multiple clusters (e.g., cluster $583_1$, . . . , cluster $583_N$) comprising multiple nodes that have multiple tiers of storage in a storage pool. Representative nodes (e.g., node $581_{11}$, . . . , node $581_{1M}$) and storage pool 590 associated with cluster $583_1$ are shown. Each node can be associated with one server, multiple servers, or portions of a server. The nodes can be associated (e.g., logically and/or physically) with the clusters. As shown, the multiple tiers of storage include storage that is accessible through a network 596, such as a networked storage 586 (e.g., a storage area network or SAN, network attached storage or NAS, etc.). The multiple tiers of storage further include instances of local storage (e.g., local storage $591_{11}$, . . . , local storage $591_{1M}$). For example, the local storage can be within or directly attached to a server and/or appliance associated with the nodes. Such local storage can include solid state drives (SSD $593_{11}$, . . . , SSD $593_{1M}$), hard disk drives (HDD $594_{11}$, . . . , HDD $594_{1M}$), and/or other storage devices.

As shown, any of the nodes of the distributed virtualization system can implement one or more user virtualized entities (e.g., VE $588_{111}$, . . . , VE $588_{11K}$, . . . , VE $588_{1M1}$, VE $588_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $587_{11}$, . . . , host operating system $587_{1M}$), while the VMs run multiple applications on various respective guest operating systems. Such flexibility can be facilitated at least in part by a hypervisor (e.g., hypervisor $585_{11}$, . . . , hypervisor $585_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $587_{11}$, . . . , host operating system $587_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 590 by the VMs and/or the executable containers.

Multiple instances of such virtualized controllers can coordinate within a cluster to form the distributed storage system 592 which can, among other operations, manage the storage pool 590. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $581_{11}$ can interface with a controller virtual machine (e.g., virtualized controller $582_{11}$) through hypervisor $585_{11}$ to access data of storage pool 590. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 592. For example, a hypervisor at one node in the distributed storage system 592 might correspond to software from a first vendor, and a hypervisor at another node in the distributed storage system 592 might correspond to a second software vendor. As another virtualized controller implementation example, executable containers can be used to implement a virtualized controller (e.g., virtualized controller $582_{1M}$) in an operating system virtualization environment at a given node. In this case, for example, the virtualized entities at node $581_{1m}$ can access the storage pool 590 by interfacing with a controller container (e.g., virtualized controller $582_{1M}$) through hypervisor $585_{1m}$ and/or the kernel of host operating system $587_{1M}$.

In certain embodiments, one or more instances of an agent can be implemented in the distributed storage system 592 to facilitate the herein disclosed techniques. Specifically, agent $584_{11}$ can be implemented in the virtualized controller $582_{11}$, and agent $584_{1M}$ can be implemented in the virtualized controller $582_{1M}$. Still more specifically, agent $584_{11}$, . . . agent $584_{1M}$ can implement all or part of a shard controller and/or a primary controller and/or any function of a virtualized controller.

Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to assigning unique I/O handling threads to non-overlapping shards of a vDisk can be brought to bear through implementation of any one or more of the foregoing techniques. Moreover, any aspect or aspects of optimizing I/O performance to and from virtual storage areas of a virtualization system can be implemented in the context of the foregoing environments.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
maintaining metadata cache to hold metadata, wherein the metadata cache is local to a node within a virtualization environment, the metadata corresponding to data stored in a storage pool in the virtualization environment, and the metadata is used to perform storage operations upon the data in the storage pool; and
compressing at least a portion of the metadata in the metadata cache that is local to the node in the virtualization environment, wherein compression is performed upon a subset of an ordered set of received metadata entries for a corresponding time period prior to inserting the subset into the metadata cache, the subset being a number of sequentially first metadata entries in the ordered set of metadata entries and a remainder of subsequent metadata entries of the ordered set of metadata entries are inserted into the metadata cache without compression, the number being based on a compression rate for the corresponding time period, and the compression rate being changeable for different time periods.

2. The method of claim 1, wherein compression for the metadata is adaptively enabled based upon analysis of a cache hit rate and a cache usage level.

3. The method of claim 2, wherein the compression is enabled when the cache hit rate and cache usage level meets respective threshold levels.

4. The method of claim 1, wherein a cache hit rate is analyzed to determine a compression rate for the metadata in the metadata cache, wherein the cache hit rate below a first threshold results in an increase in the compression rate and the cache hit rate above a second threshold results in a decrease in the compression rate.

5. The method of claim 1, wherein a cache tail hit rate is analyzed to determine whether the metadata is to be maintained in the metadata cache.

6. The method of claim 1, wherein uniform compression is performed upon the metadata for the corresponding time period.

7. The method of claim 1, wherein a virtual machine (VM) or workload is identified as being critical, and the VM or workload is associated with the metadata, wherein caching is prioritized for the metadata associated with the VM or workload.

8. The method of claim 7, wherein a user interface is provided for selection of the VM or workload by a user.

9. The method of claim 7, wherein first metadata associated with the VM or workload identified as being critical is maintained in the metadata cache and second metadata associated with a non-critical VM or workload is evicted from cache.

10. A computer program product embodied on a computer usable medium having stored thereon a sequence of instructions which, when executed by a processor causes steps, comprising:
maintaining a metadata cache to hold metadata, wherein the metadata cache is local to a node within a virtualization environment, the metadata corresponding to data stored in a storage pool in the virtualization environment, and the metadata is used to perform storage operations upon the data in the storage pool; and
compressing at least a portion of the metadata in the metadata cache that is local to the node in the virtualization environment, wherein compression is performed upon a subset of an ordered set of received metadata entries for a corresponding time period prior to inserting the subset into the metadata cache, the subset being a number of sequentially first metadata entries in the ordered set of metadata entries and a remainder of subsequent metadata entries of the ordered set of metadata entries are inserted into the metadata cache without compression, the number being based on a compression rate for the corresponding time period, and the compression rate being changeable for different time periods.

11. The computer program product of claim 10, wherein compression for the metadata is adaptively enabled based upon analysis of a cache hit rate and a cache usage level.

12. The computer program product of claim 11, wherein the compression is enabled when the cache hit rate and cache usage level meets respective threshold levels.

13. The computer program product of claim 10, wherein a cache hit rate is analyzed to determine a compression rate for the metadata in the metadata cache, wherein the cache hit rate below a first threshold results in an increase in the compression rate and the cache hit rate above a second threshold results in a decrease in the compression rate.

14. The computer program product of claim 10, wherein a cache tail hit rate is analyzed to determine whether the metadata is to be maintained in the metadata cache.

15. The computer program product of claim 10, wherein uniform compression is performed upon the metadata for the corresponding time period.

16. The computer program product of claim 10, wherein a virtual machine (VM) or workload is identified as being critical, and the VM or workload is associated with the metadata, wherein caching is prioritized for the metadata associated with the VM or workload.

17. The computer program product of claim 16, wherein a user interface is provided for selection of the VM or workload by a user.

18. The computer program product of claim 16, wherein first metadata associated with the VM or workload identified as being critical is maintained in the metadata cache and second metadata associated with a non-critical VM or workload is evicted from cache.

19. A system for managing a virtual storage system, comprising:
- a processor;
- a memory for holding code; and
- wherein the code includes instructions for maintaining a metadata cache to hold metadata, wherein the metadata cache is local to a node within a virtualization environment, the metadata corresponding to data stored in a storage pool in the virtualization environment, and the metadata is used to perform a storage operation upon the data in the storage pool; and compressing at least a portion of the metadata in the metadata cache that is local to the node in the virtualization environment, wherein compression is performed upon a subset of an ordered set of received metadata entries for a corresponding time period prior to inserting the subset into the metadata cache, the subset being a number of sequentially first metadata entries in the ordered set of metadata entries and a remainder of subsequent metadata entries of the ordered set of metadata entries are inserted into the metadata cache without compression, the number being based on a compression rate for the corresponding time period, and the compression rate being changeable for different time periods.

20. The system of claim 19, wherein compression for the metadata is adaptively enabled based upon analysis of a cache hit rate and a cache usage level.

21. The system of claim 20, wherein the compression is enabled when the cache hit rate and cache usage level meets respective threshold levels.

22. The system of claim 19, wherein a cache hit rate is analyzed to determine a compression rate for the metadata in the metadata cache, wherein the cache hit rate below a first threshold results in an increase in the compression rate and the cache hit rate above a second threshold results in a decrease in the compression rate.

23. The system of claim 19, wherein a cache tail hit rate is analyzed to determine whether the metadata is to be maintained in the metadata cache.

24. The system of claim 19, wherein uniform compression is performed upon the metadata for the corresponding time period.

25. The system of claim 19, wherein a virtual machine (VM) or workload is identified as being critical, and the VM or workload is associated with the metadata, wherein caching is prioritized for the metadata associated with the VM or workload.

26. The system of claim 25, wherein a user interface is provided for selection of the VM or workload by a user.

27. The system of claim 25, wherein first metadata associated with the VM or workload identified as being critical is maintained in the metadata cache and second metadata associated with a non-critical VM or workload is evicted from cache.

\* \* \* \* \*